United States Patent [19]

Shea

[11] 3,915,267

[45] Oct. 28, 1975

[54] DIFFERENTIAL AND BRAKING ASSEMBLY

[75] Inventor: Dennis William Shea, Toledo, Ohio

[73] Assignee: Dana Corporation, Toledo, Ohio

[22] Filed: Feb. 25, 1974

[21] Appl. No.: 445,716

Related U.S. Application Data

[63] Continuation-in-part of Ser. No. 384,815, Aug. 2, 1973, abandoned.

[52] U.S. Cl. ..................... 192/5; 74/710.5; 180/27
[51] Int. Cl.² ..................... F16h 11/00; F16d 59/00
[58] Field of Search ..................... 192/5, 12 B, 6 B; 74/710.5; 180/27, 88; 280/236, 238

[56] References Cited
UNITED STATES PATENTS

| | | | |
|---|---|---|---|
| 1,322,689 | 11/1919 | Griffing | 74/710.5 X |
| 1,903,199 | 3/1933 | Small | 192/4 A |
| 3,203,519 | 8/1965 | Schwerdhofer | 192/6 R |
| 3,378,093 | 4/1968 | Hill | 74/710.5 X |
| 3,517,572 | 6/1970 | Schmid | 192/4 A X |

FOREIGN PATENTS OR APPLICATIONS

| 19,278 | 6/1902 | United Kingdom | 192/6 B |
|---|---|---|---|

*Primary Examiner*—Benjamin W. Wyche
*Attorney, Agent, or Firm*—Robert E. Pollock

[57] ABSTRACT

The invention is a differential and braking assembly for use in two wheel drive vehicles. The apparatus accepts rotary power through rotary input means and transfers it through a differential to two separate outputs, allowing the driving wheels to rotate at different speeds while the vehicle is cornering. A one-way clutch is employed to allow the two outputs to freewheel or coast in the forward direction, at the same or different speeds, without rotation of the rotary input means. Reversal of the rotary input means actuates a brake which slows or stops the differential case. This in turn slows or stops both outputs while still maintaining the differential action for vehicle cornering during deceleration. In addition, the apparatus includes an anti-back travel feature which automatically engages the brake when the vehicle travels backward and a parking brake feature by which the brake remains set at the braking level employed. The brake may always be released by the application of forward rotary input power or by actuation of a brake release pawl which allows the normally non-rotational brake mechanism to rotate with the differential input. This also allows the vehicle to be driven in reverse by application of input power with a "direction" opposite to the normal input.

9 Claims, 6 Drawing Figures

DIFFERENTIAL AND BRAKING ASSEMBLY

CROSS REFERENCE TO RELATED APPLICATIONS

This is a continuation-in-part of U.S. Pat. Application Ser. No. 384,815 filed Aug. 2, 1973 and now abandoned.

BACKGROUND OF THE INVENTION

The invention relates to a differential and braking assembly for use in two wheel drive vehicles, and more particularly for use in three wheeled velocipedes with rear wheel drive.

Three wheeled velocipedes or tricycles having two rear wheels have generally been driven through only one rear wheel. This eliminates the need for a differential between the rear wheels and facilitates the use of a standard coaster brake assembly for the driving wheel axle. However, the use of only one of two rear wheels for application of power and braking presents serious problems. Such a vehicle tends to turn in one direction during application of power, since power application is inherently uneven. If the only braking provided is the coaster brake on one wheel, the vehicle also tends to turn rather abruptly during braking. Thus, the vehicle has poor handling characteristics and may be somewhat dangerous.

Some tricycles have been equipped with a differential to provide two rear driving wheels. The vehicles, however, have employed other type braking systems, such as wheel rim gripping brakes. Two standard coaster brake assemblies could not be independently activated by a central driving sprocket since this sprocket would be delivering power to the differential.

Other systems include a differential between the rear wheels, and an intermediate braking axle, which mounts a coaster brake. A pair of chains are utilized. One chain extends from the pedal sprocket to the intermediate axle and the other chain extends from the intermediate axle to the rear axle.

SUMMARY OF THE INVENTION

The present invention provides a novel, compact differential and braking assembly for use in two wheel drive vehicles. The assembly comprises a differential and coaster brake in one housing for even distribution of power and braking to the two rear wheels. In its application to a three-wheeled velocipede the invention eliminates problems of power application and braking inherent in similar prior art vehicles. The apparatus also includes several other braking features not found in such prior art vehicles as well as the ability to release the brake and drive the vehicle in reverse via the application of input power in the direction normally associated with braking.

Rotary power is transmitted to the assembly through rotary input means such as a sprocket. Through an input sleeve and a one-way clutch the power is transmitted to a differential case. The differential case transfers power through pinion and side gears to the two output shafts. Thus, a vehicle equipped with the device is given two wheel differentiated drive like a typical automobile, with the wheels powered at different speeds around corners.

For coasting the power input is stopped and by virtue of the one-way clutch, both outputs can freewheel, or coast in the forward direction. The two wheels may freewheel at the same speed or at different speeds if required to do so because of vehicle cornering.

For dynamic braking the rotary input is reversed. This reverses the rotation of a rotary input sleeve having a lead screw, urging a lead nut against a braking member to activate a brake. Through the brake, the rotary differential case is normally grounded to the device's stationary exterior housing. The output shafts of the device slow or stop as the differential case slows or stops, yet differential action is maintained for vehicle cornering during deceleration.

The apparatus of the invention includes an anti-back travel feature whereby the brake is automatically engaged on an upgrade if the vehicle begins to roll back due to driver fatigue, for example. Backward motion causes the input sleeve with its lead screw to rotate backward, again urging the lead nut against braking members to activate the brake. The brake is set in direct proportion to the gravitational forces acting on the vehicle so that braking is proportional and more than equal to that required to hold the vehicle from rolling backward when placed on an upgrade with no input power. Thus, the operator need only discontinue input power on an upgrade and allow the vehicle to stop to activate this parking brake.

The brake also works as a downgrade vehicle parking brake. When the operator reverses the input with sufficient force to stop the vehicle, the brake remains set at that level and holds the vehicle even though reverse input force is removed. To release the brake the operator need only apply forward input power and then continue in either the driving mode or the coasting mode.

As mentioned above, the brake device does not normally permit reverse operation of a vehicle. Nor does the bake device normally permit forward pushing of a vehicle when the brake has been set but not released. Since it is desirable to push a vehicle backward for parking or storage, to push it forward without having to apply forward rotary input power, and to allow reverse operation of the vehicle, a release mechanism may be provided for this purpose. The braking member is normally non-rotational, being grounded to the exterior housing. For provision of a release means, this non-rotational grounding of the braking member is accomplished through a spring loaded releasable pawl. When the pawl is released by the operator, the brake member is allowed to rotate along with the differential case and the vehicle can be moved freely forward or backward until the pawl is again allowed to engage. Also, while the pawl is disengaged the brake can act as a clutch and allow the vehicle to be operated in reverse through the brake.

DESCRIPTION OF THE PREFERRED EMBODIMENT

Figure 1:
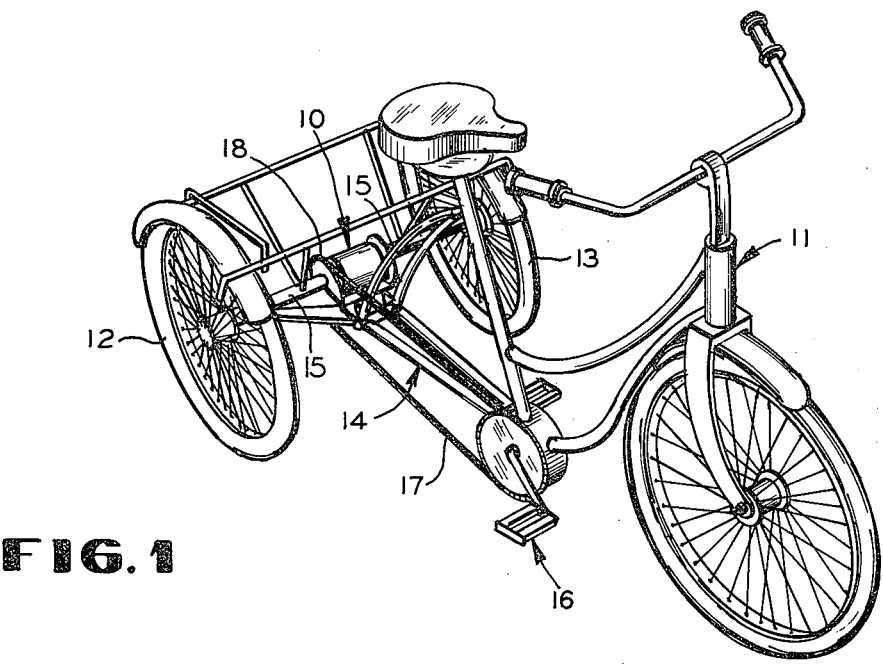
FIG. 1 is a perspective view of a tricycle incorporating the differential and braking assembly of the present invention.
Figure 2:
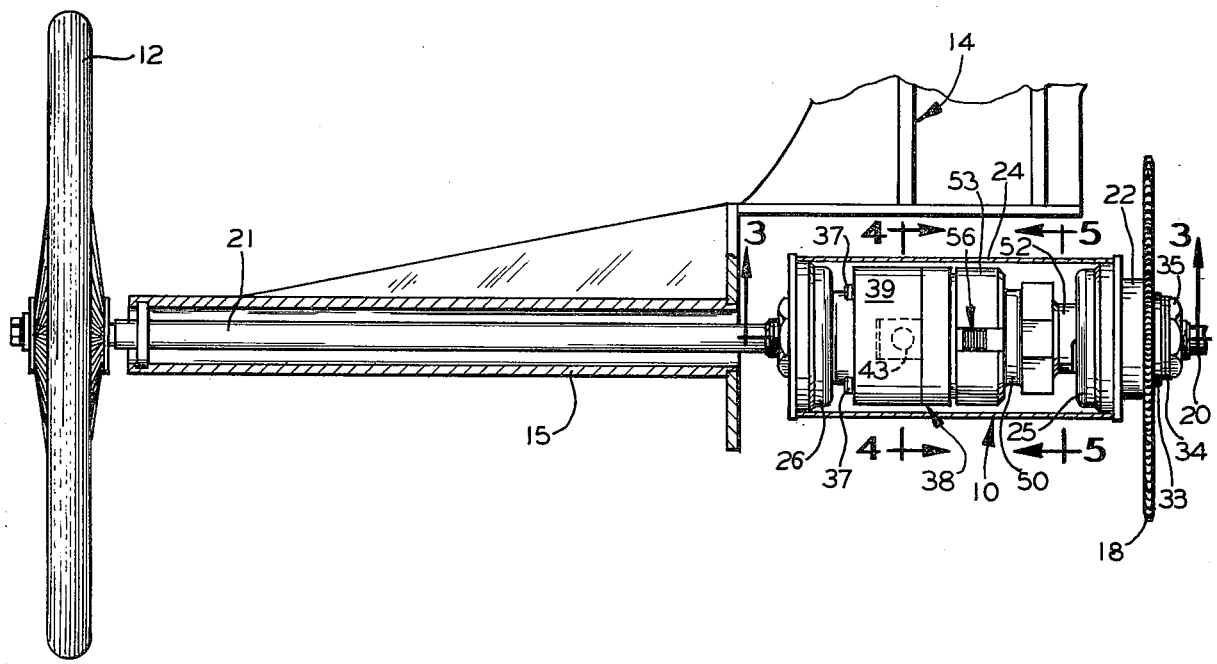
FIG. 2 is an enlarged plan view, partially broken away, of a preferred embodiment of the differential and braking assembly of the invention as employed in the tricycle shown in FIG. 1.

Referring to FIGS. 1 and 2, a differential and braking assembly, according to the present invention, is generally indicated by the reference No. 10. In many types of velocipedes and in, for example, a tricycle 11, as shown in FIG. 1, the differential and braking assembly 10 is positioned between rear wheels 12 and 13. The differential and braking assembly 10 is mounted by the tricycle frame 14, which also mounts axle tubes 15. The tricycle 11 includes pedals 16 which drive a chain 17 to rotate, in one direction or the other, a drive sprocket 18. A pair of aligned and independent output shafts 20 and 21 extend through the axle tubes 15 and operatively mount the wheels 12 and 13, respectively. The drive sprocket 18 (see FIG. 3) is fixed to a hub 22 which includes a bearing cone surface 23. In this particular embodiment, the assembly 10 includes a stationary cylindrical housing 24 having bearing cups 25 and 26 attached to its opposed ends. A circular bearing 27 is positioned between the bearing cone surface 23 of the hub 22 and the bearing cup 25. Similarly, a circular bearing 28 is positioned between the bearing cup 26 and a bearing cone 29.

A longitudinally extending input sleeve 31 surrounds the output shaft 20 and is free to rotate with respect to such shaft. The input sleeve 31 is connected to the hub 22, in this case by a splined connection 32. The input 31, therefore, rotates in response to rotation of the input drive sprocket 18. In the present embodiment, a snap ring 33 attaches the input drive sprocket 18 to the input hub 22. washer 34 surrounds the input sleeve 31 adjacent the hub 22 and a nut 35 is threadably engaged with the input sleeve 31 at its outer end.

A differential 38 is positioned within the housing 24 and includes a two-part case 39. The case 39 may be of an integral construction (not shown) or any number of parts. In the present embodiment, the two portions of the case 39 are held together by a plurality of bolts 37. The case 39 includes a bearing boss 40. The bearing boss 40 extends through an opening in the bearing cone 29 and mounts for rotary movement the output shaft 21. The case 39 also includes a circular braking shoulder 41 and an axially extending tubular member 42. A pinion shaft 43 is connected at its opposed ends to opposite sides of the differential case 39 and extends in a direction prpendicular to the axis of the output shafts 20 and 21. The pinion shaft 43 mounts a pair of pinion gears 44 which are meshed with a pair of side gears 45. The side gears 45 are fixed to the ends of the output shafts 20 and 21. Therefore, as the differential case 39 rotates, power is transferred to the output shafts 20 and 21. In the normal manner, if one of the wheels 12 or 13 is rotating faster than the other wheel, such as at a corner, the differential 38 compensates for the differing speeds of rotation of the output shafts 20 and 21. A jam nut 46 is threadably mounted on the bearing boss 40 adjacent the bearing cone 29.

Figure 3:
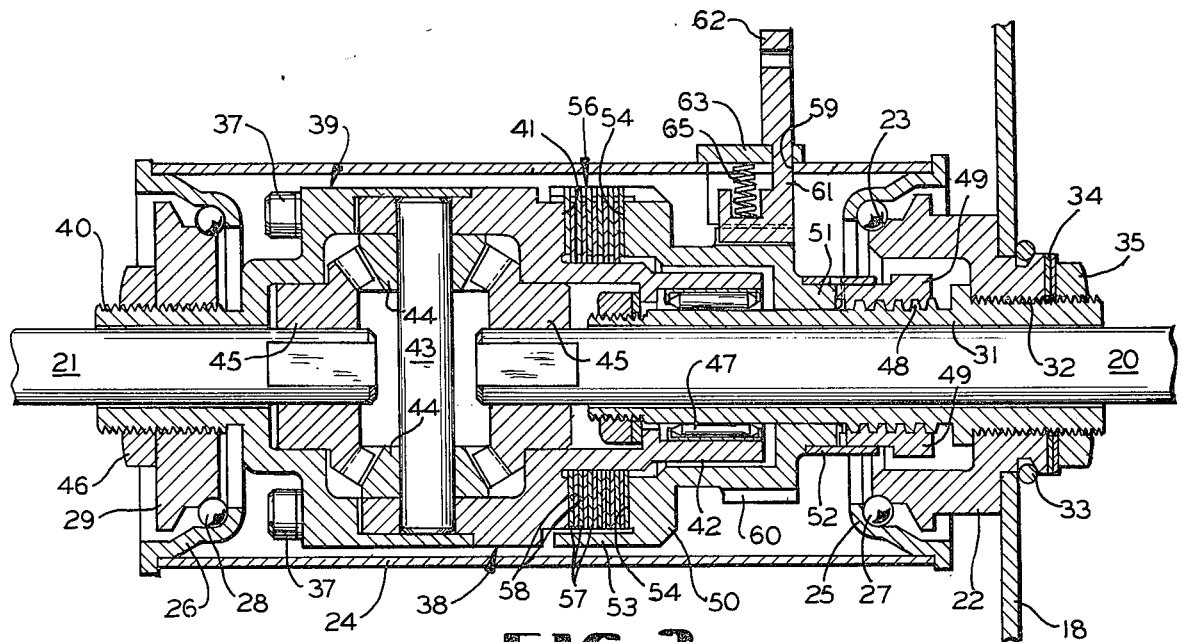
FIG. 3 is an enlarged cross-sectional view taken along the line 3—3 of FIG. 2 and showing the differential and braking assembly in its braking position.
Figure 4:
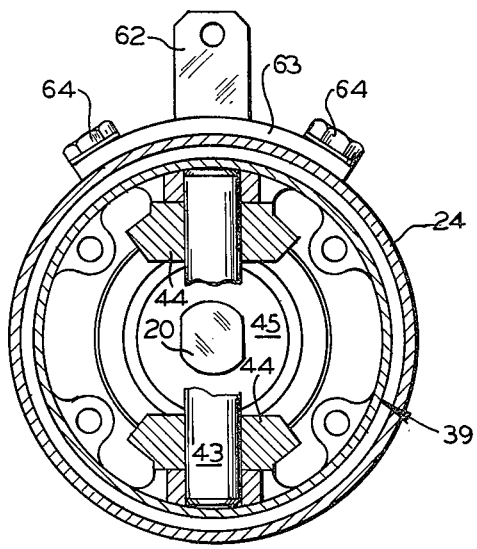
FIG. 4 is a cross-sectional view taken along the line 4—4 of FIG. 2.

Referring to FIG. 3, a one-way clutch 47 is interposed between the input sleeve 31 and the tubular member 42 which is a part of the differential case 39. The one-way clutch 47, shown in FIG. 3, is a roller type of one-way clutch and is known in the art. Other types of one-way clutches may be utilized in connection with other embodiments of the present invention. When the operator is pedalling the tricycle 11 in a forward direction and the drive sprocket 18 is rotating in a forward direction, the differential case 39 acting through the one-way clutch 47 rotates with the input sleeve 31. However, if the operator is coasting or if he is rotating the drive sprocket 18 in a reverse direction, the clutch 47 disengages the drive connection between the input sleeve 31 and the differential case 39.

The assembly 10 also includes braking means. Referring to FIG. 3, lead screw threads 48 are defined in the exterior surface of the input sleeve 31. A lead nut or member 49 is threadably engaged with the lead screw 48 of the input sleeve 31. A generally stepped tubular braking member 50 is mounted for axial longitudinal movement within the housing 24 and is normally directly connected to the stationary housing 24, as will be explained below. The braking member 50 includes a flange portion 51 adjacent the lead nut 49. A drag spring 52 is mounted between the flange portion 51 and the lead nut 49. At the other end of the braking input member 50 is an integral ring shaped flange 53 having a braking surface 54 defined adjacent its bottom edge. The braking surface 54 is aligned with and spaced from the braking shoulder 41 of the case 39. A brake pack assembly, generally indicated by the reference number 56, is positioned between the braking shoulder 41 and the braking surface 54 of the input braking member 50. The brake pack assembly 56 includes a first set of circular plates 57 which are splined to the tubular member 42 of the differential case 39 and a second set of circular plates 58, which are interleaved with the first set of plates 57, and are splined to the ring shaped flange 53 of the input braking member 50.

Figure 5:
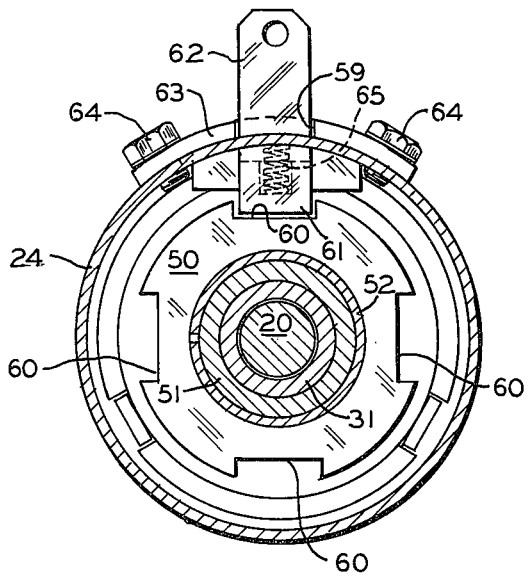
FIG. 5 is a cross-sectional view taken along the line 5—5 of FIG. 2.
Figure 6:
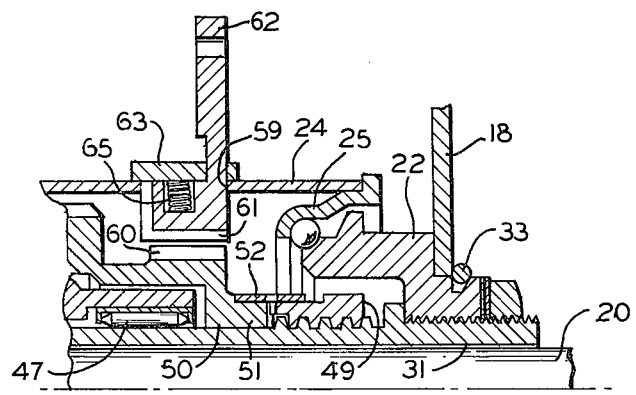
FIG. 6 is a fragmentary view of brake release mechanism shown in its disengaged position.

The input braking member 50 has four notches 60 defined in a portion of its exterior surface (see FIG. 5). Referring to FIGS. 3 and 5, the housing 24 defines an opening 59 in its periphery. A pawl 61 has an arm 62 which extends through the opening 59 outwardly from the housing 24. An arcuate member 63 mounts the pawl 61 on the housing 24 by means of screws 64. A spring 65 is interposed between the pawl 61 and the acruate member 63 to urge the pawl downwardly into engagement with one of the notches 60, as shown in FIG. 5. During normal operation of the assembly 10, either during forward rotation or reverse rotation of the drive sprocket 18, the pawl 61 is engaged in one of the notches 60, thereby forming a direct connection between the stationary housing 24 and the input braking member 50. Under normal conditions, the braking member 50 does not rotate. However, the braking member 50 is free to move longitudinally along the axis defined by the input shafts 20 and 21. The pawl 61 and the related parts, also serve as a releasable connecting means for engaging and disengaging the braking member 50 from the housing 24. Referring to FIG. 6, when the arm 62 is moved upwardly or outwardly relative to the housing 24, the pawl 61 is disengaged from the respective notch 60 of the braking member 50. This allows the braking member 50 to rotate relative to the stationary housing 24 for the purposes described below.

During normal forward rotation of the tricycle 11, when the input drive sprocket 18 is moving in a forward direction, the lead nut 49 is urged to the right of the position shown in FIG. 3. When in this position, the lead nut 49 does not engage the flange portion 51 of the input braking member 50 and the brake pack assembly 56 is not compressed. However, upon reverse rotation of the input drive sprocket 18, the lead nut 49 is urged to the left, as shown in FIG. 3, and engages the flange portion 51 of the braking member 50, thereby urging the entire braking member 50 to the left. The braking surface 54 of the input braking member 50 engages the brake pack assembly 56, thereby compressing such assembly. The compression of the first and second sets of circular plates 57 and 58 grounds the differential input or case 39 to the stationary housing 24 in varying amounts directly proportional to the reverse force applied to the input drive sprocket 18. The drag spring 52 places enough drag on the lead nut 49 to promote axial travel of the lead nut 49 when the input drive sprocket 18 is rotated in either direction.

When forward rotary motion is restored to the drive sprocket 18, the lead nut 49 is urged to the right, away from the position shown in FIG. 3, and compressive forces are removed on the brake pack assembly 56, thereby removing the braking action.

Throughout the braking action, as the differential input slows or stops, differential action for vehicle cornering during deceleration is maintained.

Braking action also occurs if the operator, for example, becomes tired while traveling up a hill. He may either set the brakes, as described above, or, if climbing a hill, merely stop the power input through the drive sprocket 18. The brakes are set in direct proporation to the gravitational forces acting on the vehicle so that braking is proporational and more than equal to that required to hold the vehicle, for example, the tricycle 11 from rolling backwards.

To use the assembly 10 as a down grade parking brake, the vehicle operator need only reverse the direction of the input drive sprocket 18 with sufficient force to stop the vehicle. The brake pack assembly 56 is compessed, as mentioned above, and will remain set and hold the tricycle 11 on the grade even though the reverse input force on the drive sprocket 18 is completely removed.

As has been described above the input of the differential and braking assembly 10, more specifically the input sleeve 31, is connected to the differential input or case 39 by the one-way clutch 47 in such a manner that forward rotation drives the case 39. The differential case 39 can also overrun the input sleeve 31 through the one-way clutch 47 for coasting purposes. However, the differential case 39 can also drive the input sleeve 31 through the one-way clutch 47. When the output shafts 20 and 21 operate or rotate in a reverse direction, they back drive the differential case 39 which, in turn, drives the input sleeve 31 in a reverse direction through the one-way clutch 47. This urges the lead nut 49 against the braking member 50 and applies the brake in direct proporation to the forces generated by gravity. Therefore, the assembly 10 automatically brakes when the tricycle 11 begins to move down a hill in a backward direction.

As explained above, once the brake is applied, it will remain applied until the operator applies forward rotation to the input drive sprocket 18. This occurs because the one-way clutch 47 does not allow the input sleeve 31 to be moved forward by further movement of the differential case 39 when the vehicle tends to move forward because of gravity or other externally applied forces on the vehicle, for example, when someone would push the vehicle.

Therefore, this serves as a downgrade hill holder, however, in some instances, for example if an operator stops the tricycle 11 in his garage by applying the brakes, it is inconvenient. Under normal operation, the operator would not be able to park the vehicle unless he released the brakes by a forward rotation of the drive sprocket 18. However, the pawl 61 serves as release means. The operator moves a lever (not shown) which is connected to the arm 62. The arm is moved outwardly away from the housing 24 which disengages the pawl 61 from its respective notch 60 defined by the braking member 50. The braking member 50 is no longer fixed to the housing 24 and, similarly, the differential case 39 is no longer operatively connected to the stationary housing 24. Therefore, the operator can push the tricycle 11 into a storage position because the case 39 and the braking member 50 are now free to rotate as a unit even though the brake pack assembly 56 is still compressed. Upon renewed operation of the tricycle 11, the arm 62 is moved inwardly until the pawl 61 engages one of the notches 60. At this time, upon forward rotation of the drive sprocket 18, the lead nut 49 moves to the right of the position shown in FIG. 3 and compressive forces upon the brake pack assembly 56 are removed.

A further, and highly desirable, feature of the present invention is that it allows the vehicle to be driven in the reverse direction. This is achieved by releasing the pawl 61 and driving the sprocket 18 in the direction normally associated with braking. When this is done the brake pack assembly 56 is compressed as in braking but is not connected to a stationary member and therefore does not provide braking. Thus, in the reverse mode, the brake pack assembly 56 serves as a clutch and allows the vehicle to be driven in the reverse direction through the differential case 39.

It has been found that the differential and braking assembly 10, according to the present invention, is most suitable for vehicular operations, particularly with respect to velocipedes such as tricycles.

The embodiments of the invention in which an enclusive property or privilege is claimed are defined as follows:

1. A differential and breaking assembly comprising, in combination, a housing, a pair of aligned and independent output shafts mounted within said housing and having ends extending outwardly of said housing, differential means operatively connected to said output shafts, input means including a one-way clutch operatively connected to said differential means for driving said output shafts through said differential means in one direction, braking means releasably connected by releasable connecting means between said differential means and said housing for braking said output shafts upon reverse movement of said input means when said braking means is connected to said housing by said releasable connecting means and said braking means driving said differential means and thereby said output shafts in the other direction upon reverse movement of said input means when said braking means is released by said releasable connecting means from said housing.

2. A differential and braking assembly according to claim 1, wherein said differential means includes differential case means mounted for rotation within said housing, a pinion shaft mounted within said differential case means, a pair of pinion gears rotatably mounted on said pinion shaft, and a pair of side gears mounted on respective ones of said output shafts and meshing with said pinion gears.

3. A differential and braking assembly according to claim 1, wherein said input means comprises an input sleeve concentric with one of said output shafts and a drive sprocket operatively connected to said input sleeve.

4. A differential and braking assembly, according to claim 1, wherin said differential means defines a brake shoulder and said braking means includes a braking member mounted within said housing, said braking member having a braking surface spaced from said brake shoulder defined by said differential means, a brake pack assembly positioned between said braking member and said brake shoulder, and means operatively connected between said input means and said braking member for compressing said brake pack assembly upon reverse rotation of said input means.

5. A differential and braking assembly according to claim 5, wherein said differential means includes a differential case having said brake shoulder defined thereon and wherein said brake pack assembly includes a first set of plates splined to said differential case and a second set of plates splined to said braking member and operatively connected to said housing, said first and second sets of plates being interleaved with one another.

6. A differential and braking assembly, according to claim 4, wherein said input drive member comprises an input sleeve having a lead screw defined on its exterior and wherein said compressing means comprises a lead nut mounted on said lead screw, said lead nut engaging said braking member upon reverse rotation of said input sleeve.

7. A differential and braking assembly according to claim 1 including a pawl mounted by said housing, said pawl having an arm extending outwardly of said housing and biasing means for urging said pawl inwardly into locking engagement with said braking member.

8. A differential and braking assembly comprising in combination: a housing; a pair of aligned and independent output shafts mounted within said housing and having ends extending outwardly of said housing; differential means operatively connected to said output shafts and defining a brake shoulder thereon; input means operatively connected to said differential means for driving said output shafts; braking means including a braking surface spaced from said brake shoulder; a brake pack assembly including a first set of plates splined to said differential case, a second set of plates splined to said brake means, said first and second sets of plates being interleaved with one another; and means operatively connected between said input and said braking member for compressing said brake pack upon reverse rotation of said input means.

9. A differential and braking assembly comprising, in combination: a housing; a pair of aligned and independent output shafts mounted within said housing and having ends extending outwardly of said housing; differential means operatively connected to said output shafts and defining a brake shoulder thereon; input drive member operatively connected to said differential means for driving said output shafts; braking means including a brake surface spaced from said brake shoulder; a brake pack assembly positioned between said braking member and said brake shoulder; and wherein said input drive member comprises an input sleeve having a lead screw defined on its exterior and a lead nut is mounted on said lead screw and driven thereby to engage said brake member upon reverse rotation.

* * * * *

UNITED STATES PATENT OFFICE
CERTIFICATE OF CORRECTION

PATENT NO. : 3,915,267
DATED : October 28, 1975
INVENTOR(S) : Dennis William Shea It is certified that error appears in the above-identified patent and that said Letters Patent are hereby corrected as shown below:

Column 2, line 35, delete "bake" and insert -- brake --.

Column 3, line 37, after "22." insert -- A --.

Column 3, line 52, delete "prpendicular" and insert -- perpendicular --.

In Claim 5, Column 7, line 23, delete "according to Claim 5" and insert -- according to Claim 4 --.

Signed and Sealed this first Day of June 1976

[SEAL]

Attest:

RUTH C. MASON
Attesting Officer

C. MARSHALL DANN
Commissioner of Patents and Trademarks